United States Patent [19]

Sachs

[11] Patent Number: 4,613,238

[45] Date of Patent: Sep. 23, 1986

[54] METHOD AND APPARATUS FOR MEASURING TEMPERATURE OF ULTRA SMALL AREAS

[75] Inventor: Frederick Sachs, Buffalo, N.Y.

[73] Assignee: The Research Foundation of State University of New York, Albany, N.Y.

[21] Appl. No.: 781,245

[22] Filed: Sep. 27, 1985

[51] Int. Cl.[4] .......................... G01K 7/00; G01K 13/00
[52] U.S. Cl. .................................... 374/174; 128/736; 204/DIG. 6
[58] Field of Search .................. 374/174, 185, 165

[56] References Cited

U.S. PATENT DOCUMENTS

| | | | |
|---|---|---|---|
| 2,291,739 | 8/1942 | McGrath | 374/174 |
| 2,737,810 | 3/1956 | De Witte | 374/174 |
| 3,064,222 | 11/1962 | Renier | 374/174 X |
| 3,565,060 | 2/1971 | Sipple | 128/902 X |
| 3,721,230 | 3/1973 | Ziernicki | 128/902 X |
| 3,946,724 | 3/1976 | Le Balme | 128/902 X |

Primary Examiner—Daniel M. Yasich
Attorney, Agent, or Firm—Donald C. Studley; Michael L. Dunn

[57] ABSTRACT

The present invention provides a method and apparatus for measuring the temperature in an ultra small area by determining the electrical resistance, or changes in electrical resistance in an electrical circuit. The system utilizes a temperature sensory element comprised of a microcapillary tube containing an ionic liquid and an electrical circuit capable of measuring the electrical resistance, or the changes in the electrical resistance, of the liquid. The temperature sensory element is of a size useful to measure the temperature in ultra small areas. The temperature sensory element ranges up to about 2.0 microns in outside diameter, and more preferably has an outside diameter between about 0.1 and about 1.0 micron, and most preferably between about 0.5 and about 1.5 micron. Minute changes in the electrical resistance of the liquid within the temperature sensory element reflect minute temperature changes in the immediate area of the temperature sensory element.

20 Claims, 1 Drawing Figure

METHOD AND APPARATUS FOR MEASURING TEMPERATURE OF ULTRA SMALL AREAS

The invention described herein was made under a grant from the United States Government and may be made and used by the United States Government without payment of any royalty.

BACKGROUND OF THE INVENTION

The present invention relates to a temperature measuring system utilizing a microthermometer or micropyrometer. The system is particularly useful for the rapid and accurate determination of temperatures of ultra miniature areas. The present system is particularly useful in providing means to obtain rapid and precise clinical temperature measurements of cellular areas of micro dimension, e.g., a single cell, or portion of a cell, or a group of specific cells, either within or without a living body.

Devices to measure temperature by measuring changes in electrical resistance are known in the prior art. Examples of such devices are: U.S. Pat. Nos. 2,210,903; 2,711,650; 2,737,810; 2,779,917 and 2,938,385. Generally such devices utilize either a resistance thermometer or a thermistor as the temperature sensory element, or probe. Typically a resistance thermometer includes a metal or semi-conductor material. Metals such a platinum, nickel or copper are commonly used. Thermistors typically utilize a solid semi-conductor ceramic-like element, e.g., oxides of manganese, cobalt, copper, uranium, iron, zinc and magnesium.

Generally electrically conducting materials become more resistant to the passage of electrical current as temperature increases. The increase in electrical resistance is, within certain determinable limits, proportional to the increase in temperature. Thus, a temperature sensing element, or probe, may be used to determine temperature by measurement of increases or decreases in the electrical resistance of the probe.

To facilitate precise temperature measurement the temperature probe is typically incorporated as part of a resistance measuring circuit. If a source of constant potential is available, the measuring circuit may merely include an ammeter, the change in electrical current reflecting the change in resistance in the circuit. A resistance bridge network, for example, a meter bridge or a Wheatstone bridge, may be used. A bridge circuit allows a comparison of resistances. In such circuits the electrical resistance of the temperature probe is accurately determined by evaluating the resistance of the probe in a balanced bridge circuit and the temperature of the probe is derived from the electrical resistance of the probe. In a particularly useful embodiment, the resistance of the temperature probe may be determined by instrument and directly read as temperature.

The present invention is particularly useful in the study of cellular or membrane phenomena wherein the accurate temperature of a cell or part of a cell is to be determined. The extremely small temperature sensory element, or probe, of the present invention allows cell penetration without causing serious injury to the cell, or disrupting the cell structure or function. The study of cellular temperature response has heretofore been confined to the study of groups of large cells because of the large size of prior art probes. In the past such limitations were particularly severe in the study of vertebrate brain, spinal cord and retina cells where the vast majority of cells are smaller than about 20 microns in diameter. The present invention is particularly useful as a tool for studying the effect of heat and temperature changes in such small cells.

It is envisioned that the present invention can be utilized to measure blood flow in capillaries or the rate of air flowing through a single alveoli in the lung. The probe portion of the present invention typically has a diameter about one-fiftieth of the diameter of a human hair.

The present invention facilitates the study of ultra small areas, cellular or subcellular. As used herein the term ultra small area means an area less than about 20 microns in diameter. It is postulated that the present invention may open research vistas not heretofore open which will encompass the study of the effects of temperature changes within a particular cell or particular cells within a group of cells.

The fabrication of microcapillary tubes aptly suited to use in the present invention is described in U.S. Application Ser. No. 693,725, filed Jan. 23, 1985, entitled, "METHOD AND APPARATUS FOR PRODUCING GLASS TUBING OF A NARROWED DIAMETER". The present invention is co-inventor of that application. The disclosure of said application is incorporated herein by reference.

BRIEF DESCRIPTION OF THE INVENTION

The present invention provides a method and apparatus for measuring the temperature in an ultra small area by determining the electrical resistance, or changes in electrical resistance in an electrical circuit. The system utilizes a temperature sensory element comprised of a microcapillary tube containing an ionic liquid and an electrical circuit capable of measuring the electrical resistance, or the changes in the electrical resistance, of the liquid. The temperature sensory element is of a size useful to measure the temperature in ultra small areas. The temperature sensory element ranges up to about 2.0 microns in outside diameter, and more preferably has an outside diameter between about 0.1 and about 1.0 micron, and most preferably between about 0.5 and about 1.5 micron. Minute changes in the electrical resistance of the liquid within the temperature sensory element reflect minute temperature changes in the immediate area of the temperature sensory element.

The present temperature measuring system is accurate within about 0.01 percent and a precision greater than $10^{-5}$. The present system has a response time of less than a millisecond. Response times in the neighborhood of 0.1 milliseconds are easily attainable. Thus, the present invention can discern temperature changes as small as $10^{-5}$°C. in about 0.1 millisecond.

The electrical circuit utilized to determine the electrical resistance, or change in resistance, may be one in which the electrical source has a constant potential. Thus, as the temperature of the temperature sensory element changes, the current within the circuit changes. The change in current reflects a change in the resistance of the circuit which, in turn, reflects a temperature change in the area of the temperature sensory element.

The microcapillary tube portion of the temperature sensory element is suitably fabricated of glass, although silica, quartz or plastic may be utilized if the environment in which the temperature sensory element is to be exposed is not compatible with glass. Preferably the microcapillary tube is fused or sealed at the tip. It is also preferred that the microcapillary tube be double barreled, that is the tube has a division, or septum, within the tube. In such cases the microcapillary tube may be suitably made into a micro U-tube by application of a momentary high potential which opens a connecting hole in the septum near the tip, that being the thinnest part of the drawn microcapillary tube. The present invention also contemplates the use of multi-barrelled microcapillary tubes. For example, a tube having three separated portions may utilize two cnnected sections as described above, and have an additional section open to the outside near the measuring end of the tube to determine the electrical potential of the source.

The ionic liquid may be an electrolyte, such as, sulfuric acid or salt solutions, or may be a slightly conductive polar organic compound, e.g., alcohols, ketones, glycols, glycol esters, polyglycol ethers, sulfones, esters or other polar organic compounds. Since the organic compounds of the foregoing types characteristically have low electrical conductivity, it is usually desirable to add an electrolyte to improve the conductivity of such materials. Particularly useful electrolytes for such mixtures are the salts of lanthanum. Solutions of high viscosity are particularly useful as increased sensitivity can be obtained. Resistance sensitivities greater than 10% per °C. are attainable.

The source of electrical current may be either alternating or direct. The use of alternating current requires that some compensation be made for phase change when utilized in a constant potential circuit arrangement. Suitably the probe portion is electrically shielded with a conductive coating, for example, sputtered gold.

DETAILED DESCRIPTION AND PREFERRED EMBODIMENT OF THE INVENTION

Figure 1:
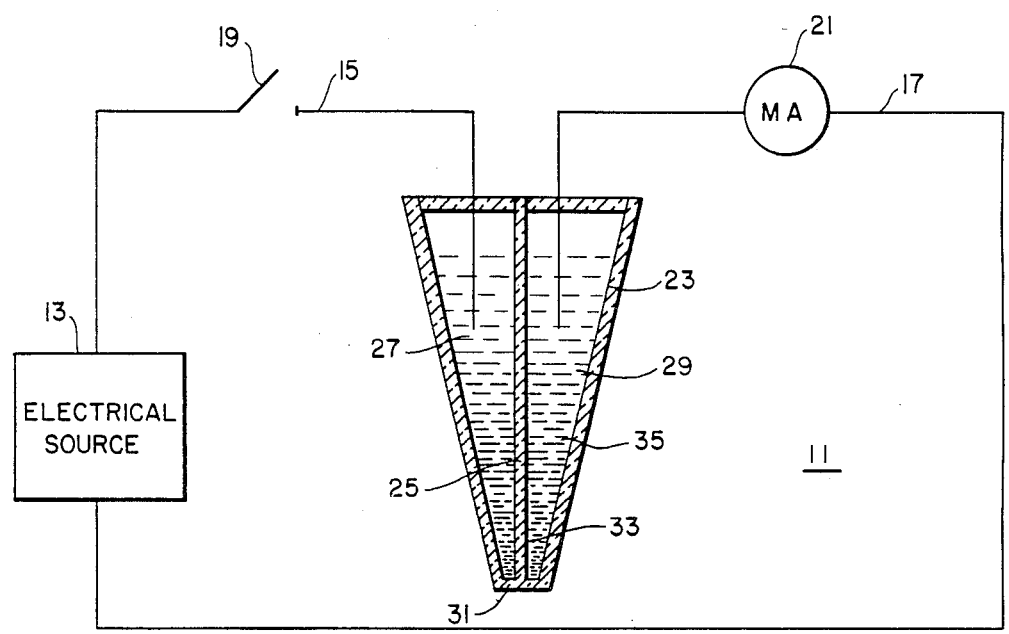

The present invention will now be described in reference to the accompanying drawing which is a schematic circuit diagram.

The drawing illustrates a measuring circuit generally denoted as 11 in which the potential of an electrical source 13 is constant. Measuring circuit 11 has lead lines 15 and 17 and switch 19, which activates and inactivates circuit 11. An ammeter 21 is mounted in measuring circuit 11. A temperature sensory element, or tube, generally denoted by 23, is shown greatly enlarged to better illustrate its details. As shown temperature sensory element 23 is a microcapillary tube having septum 25 dividing the tube into two chambers 27 and 29. The tube is sealed at the end, or tip, 31. Septum 25 has a hole 33 therethrough connecting chambers 27 and 29 to form a micro U-tube. Chambers 27 and 29 contain an ionic liquid 35. Lead wires 15 and 17 are in electrical contact with ionic liquid 35.

In operation the outside portion of the sensing tip 31 of temperature sensory element 23 is placed in contact with the ultra small area, 32, of a cell in which the temperature is to be determined. The temperature of the area is reflected in a change of temperature as sensing tip 31 and a consequent and corresponding change in the electrical resistance in ionic liquid 35 which in turn effects a change in potential within the measuring circuit. This change may be noted on ammeter 21. The change in current is caused, and is proportional to, a change in the resistance of ionic liquid 35, which, in turn, is proportional to a change in temperature within the ultra small area. The ammeter in the embodiment as shown may be directly calibrated to indicate temperature instead of current. Similarly a bridge blancing circuit may be used to determine the changes in resistance.

It will be understood that the embodiments described in the foregoing are illustrative of the invention and should not be considered as limiting, and that other embodiments of the invention are possible without departing from the scope of the invention.

What is claimed is:

1. A temperature measuring system for an ultra small area in which temperature is determined by electrical resistance, or by a change in electrical resistance, of an electrical circuit comprising:
   (a) A temperature sensory element comprised of a thinwalled microcapillary tube having a sensing contact tip, said microcapillary tube having a septum and containing an ionic liquid having determinable electric resistance, said microcapillary tube having an outside diameter less than about 2.0 microns at the sensing tip.
   (b) an electrical source,
   (c) means to electrically connect said ionic liquid in said temperature sensory element to said electrical source to form an electrical circuit, and
   (d) means to electrically connect said ionic liquid to an indicator to determine a change in the electrical resistance of said circuit caused by a change in the temperature of said ionic liquid as the sensing tip contacts the areas measured.

2. The system of claim 1 wherein said microcapillary tube has an outisde diameter between about 0.1 and about 1.0 microns.

3. The system of claim 1 wherein said microcapillary tube is fabricated of glass.

4. The system of claim 1 wherein said microcapillary tube is a micro U-tube.

5. The system of claim 1 wherein the said electrical source has a constant electrical potential.

6. The system of claim 1 wherein the electrical source is direct current.

7. The system of claim 1 wherein the electrical source is alternating current.

8. The system of claim 1 wherein the ionic liquid is an electrolyte.

9. The system of claim 1 wherein the ionic liquid is a mixture of a polar organic material and an electrolyte.

10. The system of claim 1 wherein the time of response to change of resistance is less than 1.0 millisecond.

11. A method of determining temperature of an ultra small area, in which the temperature is determined by electrical resistance, or by a change in electrical resistance, of an electrical circuit, comprising the steps of:
   (a) contacting said ultra small area with a temperature sensory element comprised of a thin walled microcapillary tube having a septum and a sensing tip, said microcapillary tube containing an ionic liquid having a determinable electrical resistance, said microcapillary tube having an outside diameter less than about 2.0 microns at the sensing tip.
   (b) electrically connecting said ionic liquid in said temperature sensory element with an electrical source to form an electrical circuit, and
   (c) measuring any change in electrical resistance of said ionic liquid with said circuit caused by a change in temperature in said ionic liquid in said sensory element in contact with said ultra small area to determine the temperature of said ultra small area.

12. The method of claim 11 wherein said microcapillary tube has a diameter between about 0.1 and about 1.0 microns.

13. The method of claim 11 wherein the said electrical source has a constant potential and the resistance, or change in resistance, of the circuit is determined by change in potential.

14. The method of claim 11 wherein the electrical source is direct current.

15. The method of claim 11 wherein the electrical source is alternating current.

16. The method of claim 11 wherein the microcapillary tube is fabricated of glass.

17. The method of claim 11 wherein the microcapillary tube is a micro U-tube.

18. The method of claim 11 wherein the ionic liquid is an electrolyte.

19. The method of claim 11 wherein the ionic liquid is a mixture of a polar organic material and an electrolyte.

20. The method of claim 11 wherein the time of response to change in resistance is less than 1.0 millisecond.

* * * * *